US008204806B2

(12) United States Patent
Craig et al.

(10) Patent No.: US 8,204,806 B2
(45) Date of Patent: Jun. 19, 2012

(54) SYSTEM AND METHOD OF PROCESSING ACCOUNT INFORMATION OVER A COMPUTER NETWORK

(75) Inventors: David Bentley Craig, San Antonio, TX (US); Jeff William Robel, San Antonio, TX (US); Bruce Wesley Wilks, San Antonio, TX (US); William Eugene Kooiman, The Woodlands, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 1276 days.

(21) Appl. No.: 10/725,168

(22) Filed: Dec. 1, 2003

(65) Prior Publication Data
US 2004/0122770 A1 Jun. 24, 2004

Related U.S. Application Data

(60) Provisional application No. 60/436,402, filed on Dec. 23, 2002.

(51) Int. Cl.
*G06Q 40/00* (2012.01)
(52) U.S. Cl. ........................................................ 705/35

(58) Field of Classification Search .................... 705/37, 705/35
See application file for complete search history.

(56) References Cited

U.S. PATENT DOCUMENTS

| 4,958,368 | A  | * | 9/1990  | Parker         | 379/91.01 |
|-----------|----|---|---------|----------------|-----------|
| 6,389,470 | B1 | * | 5/2002  | Barr           | 709/226   |
| 7,158,998 | B2 | * | 1/2007  | Bhuyan         | 707/201   |
| 2002/0143686 | A1 | * | 10/2002 | Greene et al. | 705/37   |
| 2002/0156720 | A1 | * | 10/2002 | Chow et al.   | 705/37   |
| 2002/0165815 | A1 | * | 11/2002 | Vincent       | 705/37   |
| 2003/0040997 | A1 | * | 2/2003  | Rousseau et al. | 705/35 |
| 2004/0143542 | A1 | * | 7/2004  | Magill et al. | 705/37   |

* cited by examiner

*Primary Examiner* — Eric T Wong
(74) *Attorney, Agent, or Firm* — Brooks, Cameron & Huebsch, PLLC

(57) ABSTRACT

The present invention provides a system and method of automatically establishing and electronically funding electronic accounts over a computer network. The present invention provides a series of straight-through processes operable within a client/server environment. The present invention enables the submission of on-line new account information, real-time processing of such account information, and the establishment of validated new electronic accounts for use by potential customers regardless of the availability of host processing systems.

19 Claims, 10 Drawing Sheets

```
                                                Accounts | Documents | Help | Log Off
USAA   HOME    INSURANCE    BANKING    INVESTMENTS    MEMBER SERVICES
       Access Account | Watch Lists | Open Account | Mutual Funds | Brokerage |    To Bottom ▽
       Insight | News & Research
```

USAA Mutual Fund Account Holder Information

Application Progress
0%  —  50%  —  100%

All fields are required, unless otherwise indicated. — 12

Name:         John Smith
Date of Birth: 02/28/1965
SSN:          123-45-6103

Address:     [                    ]
                 [            ] [ ▼ ] [        ]
                  City          State   Zip Code

Home Telephone: [            ] Ext. [    ]
Domestic Example: 210-123-4567
International Example: +44-1344-200000 (do not use DSN)

Work Telephone: [            ] Ext. [    ]

Primary E-Mail Address: [                        ]
Please ensure the address is complete.
Example: myname@mail.com

Secondary E-Mail Address: [                        ]

Citizenship: [ U.S. Citizen ▼ ]

If Other, specify Country of Citizenship: [              ]

What is your country of residence? [ United States ▼ ]

[Previous] [Cancel] [Next]

[FORMS] [TRADING TOUR] [FAQs] [GLOSSARY] [CONTACT US] [HOME]
                                                        To Top △

Copyright © 1997-2001, USAA. All Rights Reserved.

Invest in Your USAA Mutual Fund

Application Progress: 0% — 50% — 100%

Select the funds in which you would like to invest:

Capital Appreciation

| Fund Name | Minimum Initial Investment |
| --- | --- |
| ☐ Capital Growth Fund  Fund Info | Prospectus (30k pdf) | $2,000 |
| ☐ Emerging Markets Fund  Fund Info | Prospectus (30k pdf) | $3,000 |
| ☐ First Start Growth Fund  Fund Info | Prospectus (30k pdf) | $2,000 |
| ☐ Gold Fund  Fund Info | Prospectus (30k pdf) | $3,000 |
| ☐ Growth & Income Fund  Fund Info | Prospectus (30k pdf) | $3,000 |
| ☐ Growth Fund  Fund Info | Prospectus (30k pdf) | $3,000 |
| ☐ International Fund  Fund Info | Prospectus (30k pdf) | $3,000 |
| ☐ Science & Technology Fund  Fund Info | Prospectus (30k pdf) | $3,000 |
| ☐ Small Cap Stock Fund  Fund Info | Prospectus (30k pdf) | $3,000 |
| ☐ World Growth Fund  Fund Info | Prospectus (30k pdf) | $3,000 |

Income-Taxable

| Fund Name | Minimum Initial Investment |
| --- | --- |
| ☐ GNMA Trust  Fund Info | Prospectus (30k pdf) | $2,000 |
| ☐ High-Yield Opportunities Fund  Fund Info | Prospectus (30k pdf) | $2,000 |
| ☐ Income Fund  Fund Info | Prospectus (30k pdf) | $2,000 |
| ☐ Income Stock Fund  Fund Info | Prospectus (30k pdf) | $3,000 |
| ☐ Intermediate-Term Fund  Fund Info | Prospectus (30k pdf) | $2,000 |
| ☐ Short-Term Fund  Fund Info | Prospectus (30k pdf) | $2,000 |

Income-Tax Exempt

| Fund Name | Minimum Initial Investment |
| --- | --- |
| ☐ Tax Exempt Long-Term Fund  Fund Info | Prospectus (30k pdf) | $3,000 |
| ☐ Tax-Exempt Intermediate-Term Fund  Fund Info | Prospectus (30k pdf) | $2,000 |
| ☐ Tax-Exempt Short Term Fund  Fund Info | Prospectus (30k pdf) | $3,000 |
| ☐ California Bond Fund  Fund Info | Prospectus (30k pdf) | $2,000 |
| ☐ Florida Bond Fund  Fund Info | Prospectus (30k pdf) | $3,000 |
| ☐ New York Bond Fund  Fund Info | Prospectus (30k pdf) | $2,000 |
| ☐ Virginia Fund Bond  Fund Info | Prospectus (30k pdf) | $3,000 |

Index Funds

| Fund Name | Minimum Initial Investment |
| --- | --- |
| ☐ Extended Market Index Fund  Fund Info | Prospectus (30k pdf) | $3,000 |
| ☐ Global Titans Index Fund  Fund Info | Prospectus (30k pdf) | $2,000 |
| ☐ Nasdaq-100 Index Fund  Fund Info | Prospectus (30k pdf) | $3,000 |
| ☐ S&P 500 Index Fund  Fund Info | Prospectus (30k pdf) | $2,000 |

Asset Allocation

| Fund Name | Minimum Initial Investment |
| --- | --- |
| ☐ Balanced Strategy Fund  Fund Info | Prospectus (30k pdf) | $3,000 |
| ☐ Cornerstone Strategy Fund  Fund Info | Prospectus (30k pdf) | $2,000 |
| ☐ Growth and Tax Strategy Fund  Fund Info | Prospectus (30k pdf) | $3,000 |
| ☐ Growth Strategy Fund  Fund Info | Prospectus (30k pdf) | $2,000 |
| ☐ Income Strategy Fund  Fund Info | Prospectus (30k pdf) | $3,000 |

Money Market

| Fund Name | Minimum Initial Investment |
| --- | --- |
| ☐ Money Market Fund  Fund Info | Prospectus (30k pdf) | $2,000 |
| ☐ Tax Exempt Money Market Fund  Fund Info | Prospectus (30k pdf) | $3,000 |
| ☐ Treasury Money Market Trust California  Fund Info | Prospectus (30k pdf) | $2,000 |
| ☐ Money Market Fund  Fund Info | Prospectus (30k pdf) | $2,000 |
| ☐ Florida Tax-Free Money Market Fund  Fund Info | Prospectus (30k pdf) | $2,000 |
| ☐ New York Money Market Fund  Fund Info | Prospectus (30k pdf) | $2,000 |
| ☐ Virginia Money Market Fund  Fund Info | Prospectus (30k pdf) | $2,000 |

Previous | Cancel | Next

Copyright © 1997-2001, USAA. All Rights Reserved.

Fig. 1C

SYSTEM AND METHOD OF PROCESSING ACCOUNT INFORMATION OVER A COMPUTER NETWORK

This patent application claims priority from a provisional patent application entitled "Online New Accounts," Ser. No. 60/436,402, having a filing date of Dec. 23, 2002.

FIELD OF THE INVENTION

The present invention relates generally to electronic commerce and, more particularly, to a system and method of processing account information and transacting electronic commerce over a computer network.

BACKGROUND OF THE INVENTION

The internet has emerged as a large community of electronically connected users located around the world who readily and regularly exchange significant amounts of information. The internet continues to serve its original purpose of providing access and exchange of information among government agencies, laboratories, and universities for research and education. In addition, the internet has evolved to serve a variety of interests and forums that extend beyond its original goals.

There is growing interest in electronic commerce, whereby individuals and/or entities can transact business via interconnected networks, such as the internet. Electronic commerce offers advantages to both buyers and vendors. With electronic commerce, a buyer may access many more vendors than could be achieved via conventional methods of commerce. Thus, with electronic commerce, buyers can potentially achieve a lower purchase price, as well as a wider selection of goods and/or services. By the same token, electronic commerce affords vendors a larger market place, and access to a larger number of potential buyers.

Much of the electronic commerce presently conducted between buyers and vendors occurs by the exchange of data in the form of graphics and/or text. Typically, a buyer seeking to purchase goods and/or services electronically initiates the transaction by first establishing a data link with the vendor. For example, if the vendor possesses a website on the worldwide web portion of the internet, the buyer initially makes a connection via a computer, to an internet service provider. Once connected, the buyer then enters the universal resource locator (URL) associated with vendor to access that vendor's website. After the buyer has accessed the vendor's website, the buyer enters the information needed to complete the transaction.

Today, the internet is widely utilized in connection with the sale of financial products. Financial institutions, such as banks and insurance companies, provide online financial product information for browsing by the customer. For a majority of financial products, online purchasing is fairly straightforward if the host systems are available to set up an electronic account through which a customer may fund and transact business. However, online purchasing may not be available if the financial institution's host processing systems are undergoing batch processing or are otherwise unavailable.

In short, most financial institutions require that an electronic account be set up, as well as funded, prior to the purchase of a financial product. Thus, if a potential customer accesses the financial institution's website while its host system is unavailable, the financial institution is unable to provide the potential customer with the ability to purchase a financial product. Typically, under such circumstances, the financial institution will display a text message to the potential customer informing them that they will be contacted by a customer service representative within a predetermined period of time. Such an occurrence is unacceptable for many potential customers who live in different time zones or have limited access to the internet. Thus, there remains a need for a system and method capable of opening an electronic account and transacting business over the internet while host processing system(s) are unavailable.

SUMMARY OF THE INVENTION

Accordingly, the present invention provides a system and method capable of automatically establishing and electronically funding electronic accounts over a computer network. The present invention provides a series of straight-through processes operable within a client/server environment. The present invention enables the submission of online new account information, real time processing of said account information, and the establishment of validated new electronic accounts for use by potential customers regardless of the status of the host processing systems.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1A-1E are screen shots illustrating the graphic user interface of one embodiment of the present invention.

DETAILED DESCRIPTION OF THE INVENTION

The present invention is herein described as a method of processing information and as a computer system for processing information.

Figure 1:
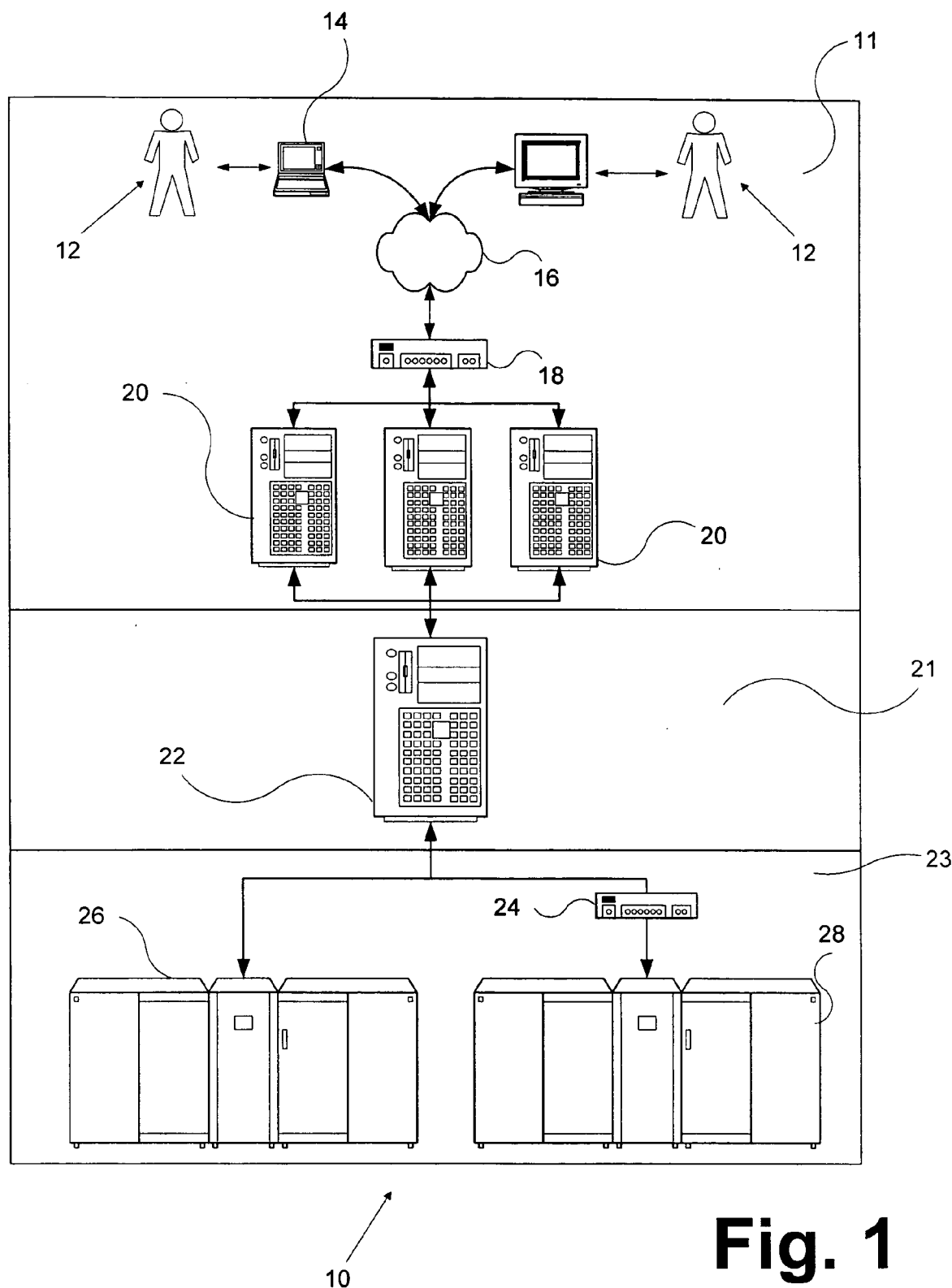
FIG. 1 is a component diagram illustrating one embodiment of the present invention.
Figure 1A:
Figure 1D:
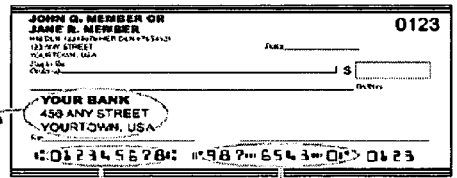
Figure 1E:

Referring to FIG. 1, the present invention comprises a system (10) capable of interaction with one or more customers (12) for the purpose of transacting e-commerce. In one embodiment, the customer (12) may utilize a remote computer system (14), such as a personal computer or laptop, to connect with the present invention through a computer network (16).

In one embodiment, the computer system of the present invention comprises a presentation tier (11) designed to interact with the customer's computer system. Specifically, by accessing a URL address through a computer network such as the internet, the customer may be granted access to, and transact business, using the present invention. In one embodiment, security infrastructure is utilized to provide security to the system against unauthorized access and/or harmful viruses. In one embodiment, a firewall (18) positioned between the web servers (20) and the computer network (16) is utilized for this purpose.

The presentation tier (11) of the present invention is capable of managing the customer's interaction with the new account opening process of the present invention. In one embodiment, web server technology such as a server farm of Intel Pentium 4/MS Windows servers running Microsoft's IIS, or a Sun Microsystems E10,000/Solaris running IBM's Websphere or BEA's weblogic servers is utilized by the presentation tier to facilitate customer interaction.

Referring to FIGS. 1A-1E, the presentation tier of the present invention provides a graphic user interface (GUI) (25) viewable by the customer during an on-line encounter with the system. In short, the graphic user interface allows the customer to view and enter account set-up information regardless of the status of the back-end or host processing systems (26 and 28, respectively). To accomplish this, the present invention provides a middleware tier (21) including one or more transaction and database servers (22) capable of accepting requests to establish new electronic accounts from the presentation tier. The middleware servers (22) of the present invention are designed to manage customer requests, interact with back-end and/or host systems, and respond to the web servers (20). Such responses may include error messages requesting additional information or messages requesting the clarification of conflicting information. The middleware servers are capable of acknowledging the successful creation of an account and a new account number associated therewith. Further, the middleware servers are capable of recording database logs of activity in order to manage the workflow of the system as well as produce management reports for monitoring and reconciling on-line activity.

In one embodiment, the servers used by the middleware tier of the present invention are Unix-based mid-range RISC servers, for example IBM RS/6000 S80 and Sun E10,000 servers. Further, these may be operated as clusters of Windows-based servers having Intel Pentium or HP Alpha processors therein. In another embodiment, middleware applications may be custom-coded using Oracle stored procedures, C++, or leverage packaged middleware products such as BEA Tuxedo or TIBCO Active Enterprise Products including Business Process Management 2.0. In short, the middleware tier (21) provides interaction between the host access tier (23) and the presentation tier (11) to facilitate efficient communication therebetween.

The host access tier (23) of the present invention represents the programming interfaces, network connectivity and account management systems capable of operating mainframe computers in a local or remote data center. In one embodiment, the host access tier comprises one or more processing systems (26 and 28, respectively) designed to facilitate on-line account creation and electronic transactions. It being understood that such processing systems may be equipped with security infrastructure such as a vendor firewall (24) to provide security against unauthorized access.

It should be understood that the present invention may be utilized with any number of hardware components and that the present invention is not limited to those explicitly described herein. For the purposes of illustration only, in one embodiment, the host processing system may comprise a brokerage management system. In one embodiment, a SunGard Securities Processing Phase3 system is utilized. The Phase3 system is a real-time order-to-settlement securities processing system for broker/dealers and correspondent clearing firms. Other suitable brokerage management systems include, but are not limited to, ADP's Brokerage Processing Services, ADP's Securities Industry Software, and Thomson Financial's BETA System.

The host processing system may also be a mutual fund management system such as SunGard's Investar*ONE, DST's TA2000, PFPC's PAR and SuRPAS Systems. In one embodiment, the mutual fund management system utilized by the present invention is a proprietary transfer agency platform capable of providing mutual fund processing for a proprietary family of mutual funds offered by the Applicant.

In one embodiment, the host processing system is an annuity management system such as CSC's PolicyLink Administration System. Further, the host processing system may also be a financial account processing system capable of addressing any financial asset or liability account that is maintained on-line for a retail customer. Other processing systems that may be utilized in accordance with the present invention include a mutual fund wrap management system such as FundQuest's Mutual Fund WRAP platform, Checkfree APL WRAP, and PFPC's AssetDirections unified managed account platform, a separate managed account system such as Checkfree APL, and PFPC's AssetDirections, a deposit account management system such as ALLTEL Community Bank Group, Fiserv, and M&I Data Services, and a loan account management system such as the ALLTEL Community Bank Group LoanPro, the CSC's Loan Origination System, and the First Data Resources Credit Card Processing system.

In one embodiment, the host access tier comprises a first system (26) designed to conduct brokerage transactions and a second system (28) designed to conduct mutual fund transactions. If the systems (26 and 28 respectively) are available, the user may 1) open an account and 2) transact business over the computer network (16).

Many known systems allow for the creation of electronic accounts for the purpose of transacting on-line business. Unfortunately, these known systems do not allow such interaction when the back-end or host systems are unavailable. This is especially a problem for companies wishing to do business on a global scale. Further, most processing systems are required to undergo periodic batch processing which may incapacitate the system for a period of several hours.

Figure 2A:
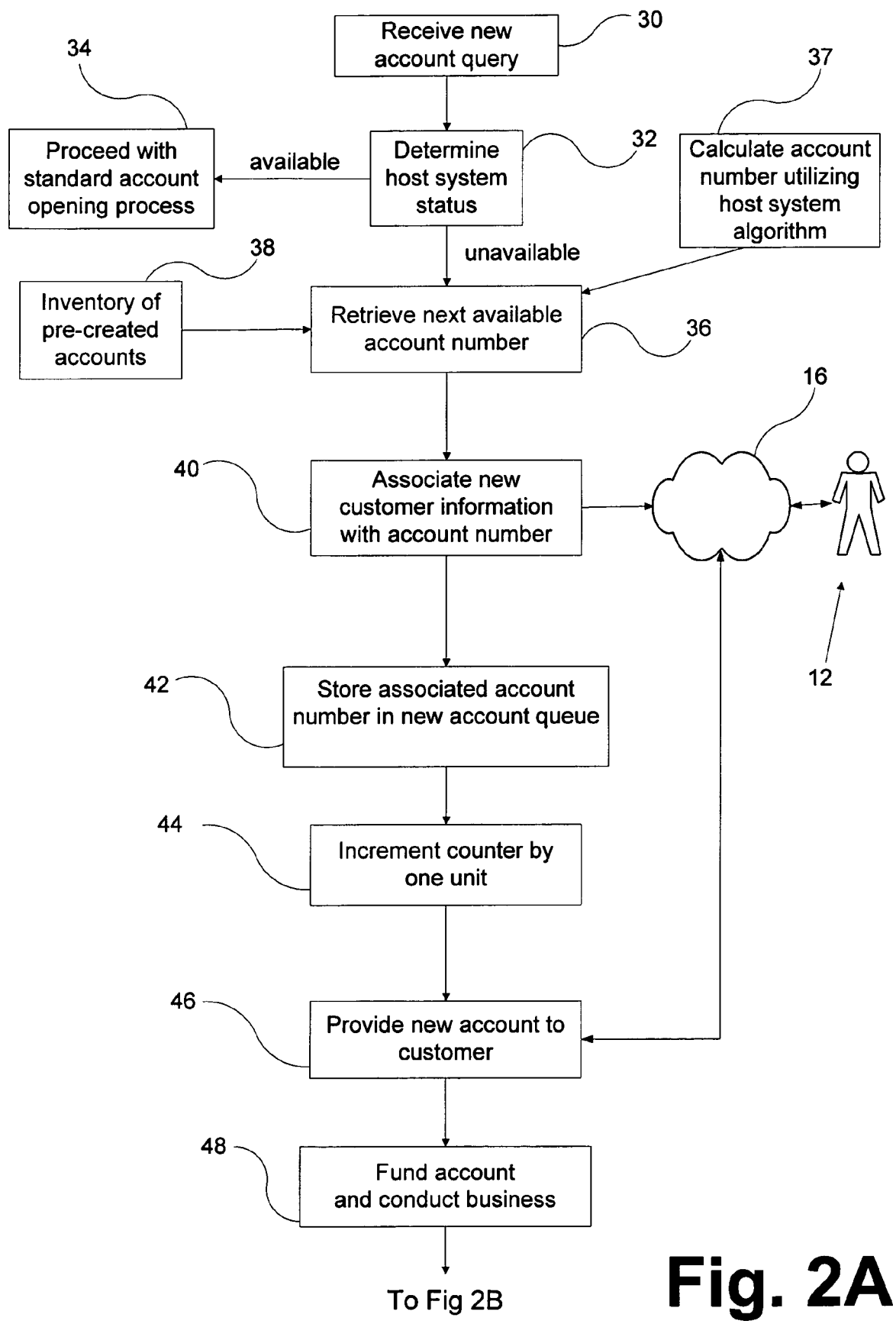
FIGS. 2A-2B are process flow diagrams illustrating the automated electronic account formation process of one embodiment of the present invention.
Figure 2B:
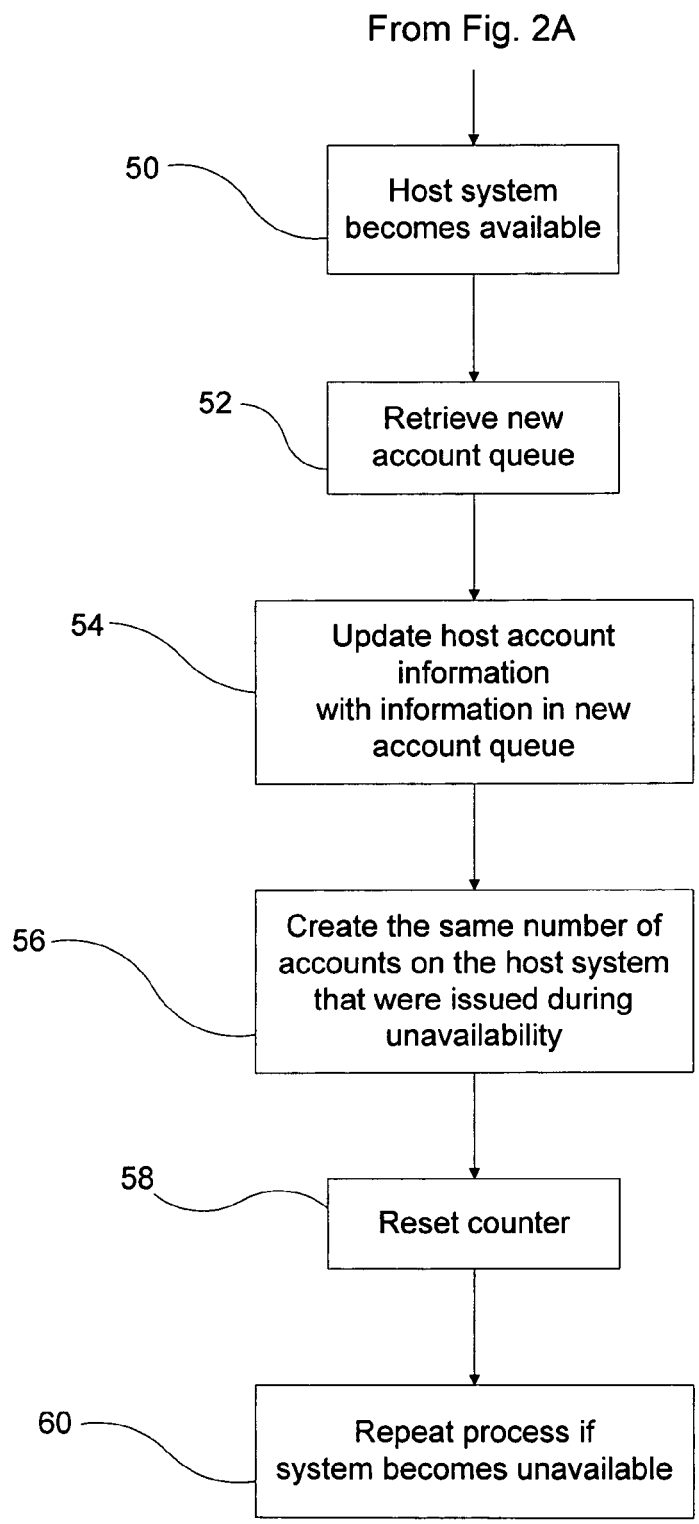

In order to address this concern, the present invention is capable of creating and funding new electronic accounts while the back-end or host systems are unavailable. Referring to FIGS. 2A and 2B, the present invention receives a new account query from an on-line customer (12), as illustrated by box (30). Upon receiving the customer query, the system then determines the status of the back-end or host systems, as illustrated by box (32). If the back-end or host system is available, the system proceeds with the standard account opening process conducted by and through the back-end or host systems, as illustrated by box (34). In one embodiment, this process utilizes an online application programming interface (API) to submit real time new account requests to the appropriate host system. The host system then creates new accounts and issues new account numbers.

However, if the host system is undergoing batch processing or is otherwise unavailable, the middleware server of the present invention will retrieve the next available account number from an inventory of precreated accounts held therein, as illustrated by boxes (36) and (38). In short, the system is equipped with one or more accounts that have been precreated for the purpose of providing on-line service to customers during host system unavailability. In this way, the present invention allows the customer to be fully serviced and even transact business while the host systems are unavailable.

Once customer information is received via the computer network (16), customer information is associated with the next available account number drawn from the inventory of precreated accounts as described above and illustrated by box (40). This new account is then stored in a temporary repository, as illustrated by box (42). In one embodiment, a new account queue held upon the middleware server is utilized for this purpose. The middleware server assigns an account number from a precreated group of account numbers and queues the updated transactions for posting to the host processing system once it becomes available. Since the middleware tier manages the interaction of the presentation tier and the host access tier, customers can receive acknowledgement of their new account, fund the account, and submit trades in the new account while the account and those transactions are held in queue.

An electronic counter is utilized to maintain a record of the number of precreated accounts held upon the middleware server. Once an account has been associated with a new customer, the electronic counter is increased to reflect same, as illustrated by box (44). New account information and the details relating thereto may then be displayed and provided to the customer via the graphic user interface, as illustrated by box (46). Once a new account has been established, the customer is then given the opportunity to electronically fund the account so as to enable immediate transaction capabilities, as illustrated by box (48). This feature of the present invention provides the customer with greater convenience than that seen in known systems, thus allowing the customer to take advantage of beneficial financial transactions as quickly as possible. This feature of the present invention is described in greater detail below.

Referring to FIG. 2B, once the host system becomes available or completes batch processing, the present invention retrieves new account information from the temporary repository and updates the appropriate host system with new account information held upon the temporary repository, as illustrated by boxes (50), (52) and (54). To account for the new accounts created during host system unavailability, the present invention receives information from the electronic counter to determine the net amount of new accounts created. The same number of accounts may then be created for future use and stored on the middleware server, as illustrated by box (56). At this time, the electronic counter is reset and the process described above is repeated if the host system(s) once again becomes unavailable, as illustrated by boxes (58) and (60).

In an alternate embodiment, the middleware server of the middleware tier retrieves the last account number provided by the appropriate processing system just prior to batch, the middleware then calculates the next available account number using the same account number assignment algorithm as the appropriate processing system as illustrated by box (37). The middleware server then tracks the new account numbers and queues the new accounts and transactions for posting upon availability of the host processing system. The middleware server passes the last account number created on the middleware tier back to the host processing system prior to the host processing system's emergence from batch ensuring the account number sequence remains synchronized. Again, since the middleware tier manages the interaction of the presentation tier with the host access tier, customers can receive acknowledgement of their new account, fund the account, and submit trade orders to the new account while the account and those transactions are held in queue. Once the host system becomes available, the middleware server then submits the queue of new accounts assigned during the period of unavailability, flushes the queue of funded transactions and pending trade orders all prior to the upcoming daily processing.

Figure 3:
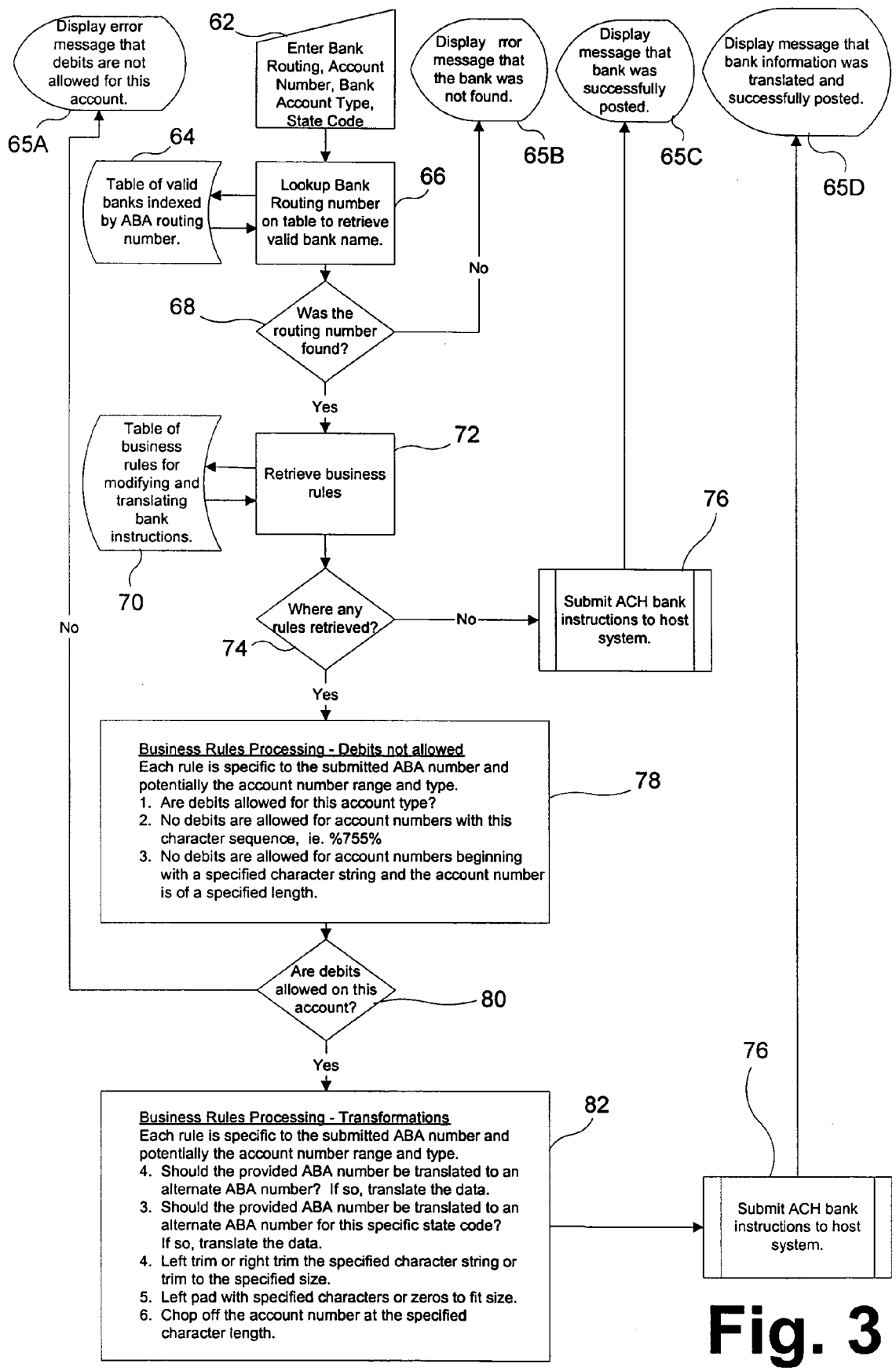
FIG. 3 is a process flow diagram illustrating the bank account validation process of one embodiment of the present invention.

Referring to FIG. 3, the present invention provides a method and system for facilitating the funding of new electronic accounts. Further, the present invention is capable of validating inputted customer bank account information. In one embodiment, this is accomplished by the creation and storage of a table containing a listing of financial institutions indexed by American Banking Association (ABA) routing numbers, as illustrated by box (64). Further, the present invention maintains a table of business rules used for modifying and translating bank instructions. Specifically, each banking institution maintains its own set of rules with regard to financial accounts. In order to provide the present invention with increased versatility, a rules engine is utilized for the manipulation of a series of banking rules pertaining to each major banking institution. This feature of the present invention allows the system to interpret financial institution information, such as bank routing number, bank account type, bank account number, and geographical area code as entered by the customer, as illustrated by box (62).

In one embodiment, the invention receives customer financial institution information and cross-references the table of financial institution information to ensure that the financial institution at issue is valid, as illustrated by box (66). In one embodiment, the routing number provided by the customer is utilized for this purpose, as illustrated by box (68). If the financial institution at issue is not found during this search, the system will inform the customer that their account is not supported by the financial institution, as illustrated by box (65B).

If the financial institution is supported, the system retrieves the aforementioned business rules from one or more tables maintained by the present invention. In one embodiment, the request to add financial account information originates from the presentation tier. The middleware server of the middleware tier is capable of validating, verifying, and amending the financial account information to conform with the stored business rules. In one embodiment, the present invention may reject the request, accept it as entered, or accept it as modified by the applicable business rule. Once accepted, the requests are submitted to the appropriate account management system (26 and 28, respectively) in real-time, or queued for submission if the system was unavailable at the time of the initial request, as illustrated by boxes (70), (72), (74), and (76). The graphic user interface (25) is utilized to inform the customer (12) that the ACH bank instructions have been submitted and successfully posted to the host system, as illustrated by box (65C).

In addition to insuring that the customer entered financial account information is adequate, the present invention is also capable of informing the user of same via the graphic user interface. For example, if the user enters a financial institution routing number improperly, the middleware server will suggest the proper format in light of the applicable business rule. This feature of the present invention reduces the frustration encountered by many on-line customers. Specifically, in most instances, information that is entered incorrectly will simply be rejected by the on-line host. In contrast, the present invention provides the on-line customer with feedback and/or guidance as to how to enter the correct information so that a new account may be created, funded, and utilized to transact business.

In one embodiment, the business rules maintained by the present invention are utilized to determine if debit transactions are allowed for any given financial institution account provided by the customer, as illustrated by boxes (78) and (80). Further, if a financial institution account provided by the customer is determined to be incapable of supporting debit transactions, the customer is informed accordingly via the graphic user interface, as illustrated by box (65A). As discussed above, the middleware server of the present invention is capable of automatically formatting the financial institution account information provided by the customer, if desirable. In one embodiment, this may include adding or deleting an alpha-numeric character and/or the use of an alternate ABA number, as illustrated by box (82). If automatic formatting is executed by the present invention, an updated ACH bank instruction is submitted to the host processing system and the customer is informed accordingly, as illustrated by boxes (76) and (65D).

Figure 4:
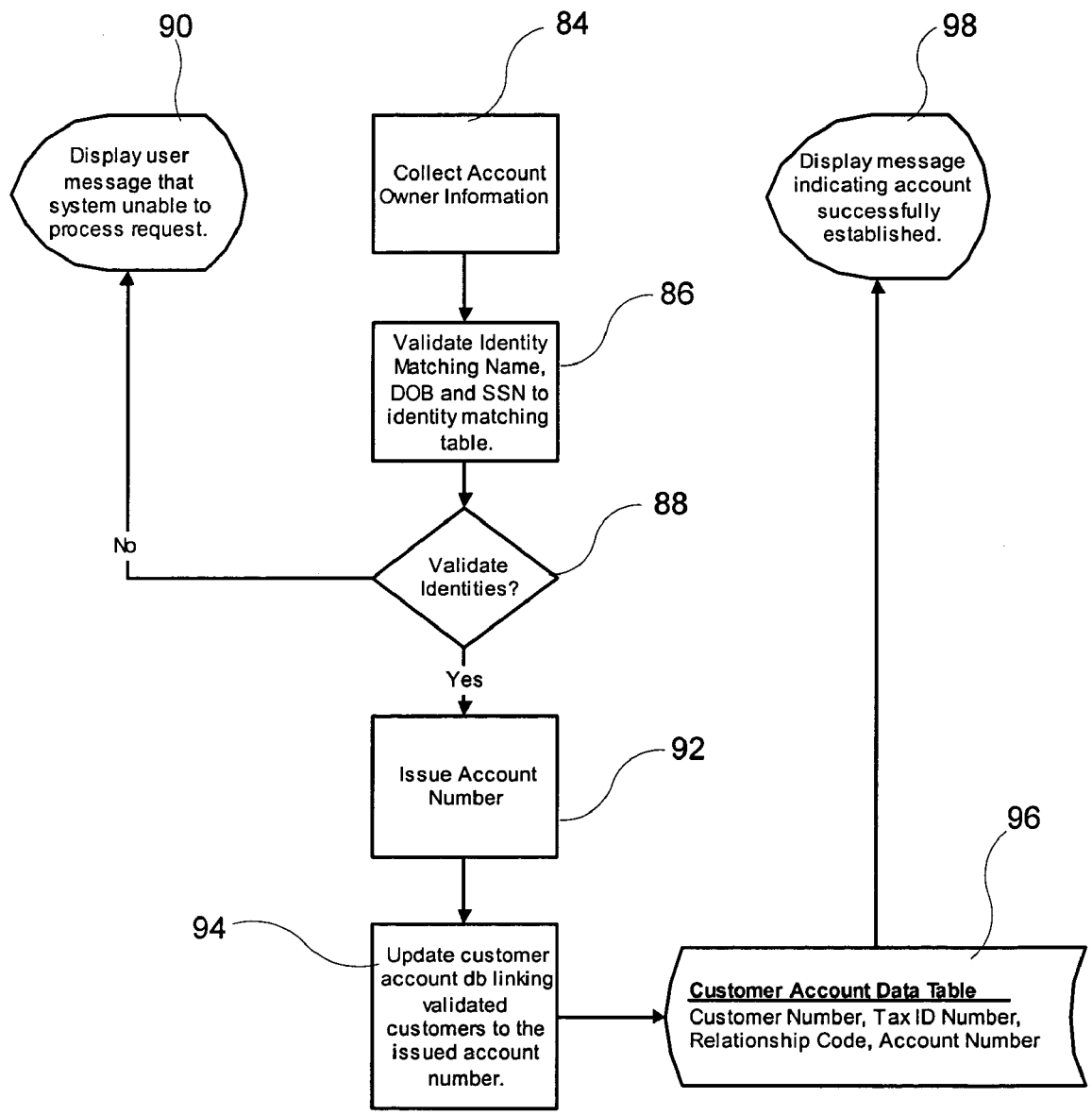
FIG. 4 is a process flow diagram illustrating the account relationship management process of one embodiment of the present invention.

Referring to FIG. 4, the present invention also provides an access management system and method capable of validating customer identities and subsequently linking multiple customer identities to a single account. Further, the present invention is capable of rejecting invalid identities such that those having no business accessing another's account will not be allowed to do so. This feature of the present invention is ideal for customers wishing to provide access to family members, relatives, or other third parties.

The present invention first receives customer information relating to the primary customer for any given account number. This information is then validated to ensure conformance with current records, if any, relating to the customer at issue. All information collected is used to create a matching table for storage upon the middleware server, that may be used to determine future account access. Specifically, each third party is labeled according to a predefined set of identifiers. In one embodiment, these identifiers comprise administrator, beneficiary, conservator, executor, guardian, joint tenants, minor, personal representative, plan participant, power of attorney, retiree, spouse, tenants in common, and trustee.

Thus, by conducting a search for third parties having a relationship to the primary customer for any given account, the present invention may efficiently determine which parties shall be granted access. If, however, the search reveals that one or more third parties may not be given access to the account number at issue, the customer is informed via the graphic user interface of the present invention as illustrated by boxes (84), (86), (88), and (90). In contrast, if the identity of one or more third parties is validated according to the matching table of the present invention, a new account number is issued and the middleware server storage device is updated to reflect those relationships applicable to the primary customer and his or her account number, this information being further displayed and/or provided to the customer via the graphic user interface, as illustrated by boxes (92), (94), (96), and (98).

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

We claim:

1. A method enabling the transaction of business between a customer and a host processing system, wherein a computer network is operatively coupled to a web server which in turn is operatively coupled to the host processing system, comprising:

receiving personal information relating to the customer at a middleware tier comprising at least one transaction and database server, wherein said middleware tier includes hardware operatively coupled to said host processing system and to said web server;

determining, at said middleware tier, that said host processing system is unavailable;

determining, at said middleware tier when said host processing system is unavailable, an available account number from an inventory of precreated accounts;

associating said personal information with said available account number to create an electronic record;

storing said electronic record in a temporary repository of the middleware tier to establish within said temporary repository an electronic account relating to said customer;

receiving database transaction instructions from said customer relating to said electronic account at the middleware tier, wherein one of the database transaction instructions includes funding said electronic account;

validating, verifying, and amending bank account information associated with said electronic account to conform with business rules using a rules engine on the middleware tier when the host processing system is unavailable;

utilizing said electronic account by executing said database transaction instructions at the middleware tier to perform a financial transaction;

creating a log of executed database transactions associated with said electronic account;

determining that said host processing system is available;

retrieving said electronic account from said temporary repository; and copying said electronic account and said log of executed database transactions to said host processing system.

2. The method of claim 1, wherein said available account number is calculated through application of a computer algorithm matching that utilized by said host processing system when said system is available.

3. The method of claim 1, wherein said temporary repository comprises a new account queue.

4. The method of claim 1, wherein said electronic account is extracted from an inventory of blank electronic accounts.

5. The method of claim 1, wherein said host processing system comprises an online account management system selected from the group consisting of a brokerage management system, a mutual fund management system, an annuity management system, a financial account processing system, a mutual fund wrap management system, a separate managed account system, a deposit account management system, and a loan account management system.

6. The method of claim 1, wherein said method further comprises the additional step of:

recording the number of accounts created during system unavailability.

7. The method of claim 6, wherein said method further comprises the additional step of:

resetting a counter upon system availability.

8. A middleware server electronically accessible to at least one customer and operatively coupled to at least one host processing system, comprising:

a computer having a transaction and database server including a temporary repository, wherein the computer is configured for:

receiving personal information relating to a customer;

determining that said host processing system is unavailable;

determining, when the host processing system is unavailable, an available account number from an inventory of precreated accounts;

associating said personal information with said available account number to create an electronic record;

storing said electronic record in said temporary repository of the middleware server to establish within said temporary repository an electronic account relating to said customer;

receiving database transaction instructions from said customer relating to said electronic account at the middleware server, wherein one of the database transaction instructions includes funding said electronic account;

validating, verifying, and amending bank account information associated with said electronic account to conform with business rules using a rules engine on the middleware server when the host processing system is unavailable;

utilizing said electronic account by executing said database transaction instructions at the middleware server to perform a financial transaction;

creating a log of executed database transactions associated with said electronic account;

determining that said host processing system is available;

retrieving said electronic account from said temporary repository; and providing said electronic account and said log of executed database transactions associated with said account to said host processing system.

9. The computer system of claim 8, wherein said temporary repository comprises a new account queue.

10. The computer system of claim 8, further comprising extracting said electronic account from an inventory of blank electronic accounts held upon a storage device coupled to said server.

11. The computer system of claim 8, wherein said host processing system comprises an online account management system selected from the group consisting of a brokerage management system, a mutual fund management system, an annuity management system, a financial account management system, a separate managed account system, a deposit account management system, and a loan account management system.

12. A non-transitory computer readable medium comprising instructions for causing a computer in a middleware tier to execute the steps of:

receiving personal information relating to a customer at a middleware tier comprising at least one transaction and database server, wherein said middleware tier is operatively coupled to a host processing system and to a web server;

determining that said host processing system is unavailable;

determining, when the host processing system is unavailable, an available account number from an inventory of precreated accounts;

associating said personal information with said available account number to create an electronic record;

storing said electronic record in a temporary repository of the middleware tier to establish within said temporary repository an electronic account relating to said customer;

receiving database transaction instructions from said customer relating to said electronic account at the middleware tier, wherein one of the database transaction instructions includes funding said electronic account;

validating, verifying, and amending bank account information associated with said electronic account to conform with business rules using a rules engine on the middleware tier when the host processing system is unavailable;

utilizing said electronic account by executing said database transaction instructions at the middleware tier when the host processing system is unavailable;

creating a log of executed database transactions associated with said electronic account;

determining that said host processing system is available;

retrieving said electronic account from said temporary repository; and copying said electronic account and said log of executed database transactions to said host processing system.

13. The non-transitory computer readable medium of claim 12, wherein said available account number is calculated through application of a computer algorithm matching that utilized by said host processing system when said system is available.

14. The non-transitory computer readable medium of claim 12, wherein said temporary repository comprises a new account queue.

15. The non-transitory computer readable medium of claim 12, wherein said electronic account is extracted from an inventory of blank electronic accounts.

16. The non-transitory computer readable medium of claim 12, wherein said host processing system comprises an online account management system selected from the group consisting of a brokerage management system, a mutual fund management system, an annuity management system, a financial account processing system, a mutual fund wrap management system, a separate managed account system, a deposit account management system, and a loan account management system.

17. The non-transitory computer readable medium of claim 12, wherein said steps further comprise recording the number of accounts created during system unavailability.

18. The non-transitory computer readable medium of claim 17, wherein said steps further comprise resetting a counter upon system availability.

19. A method enabling the transaction of business between a customer and a host processing system, wherein a computer network is operatively coupled to a web server which in turn is operatively coupled to the host processing system, comprising:

receiving personal information relating to the customer at a middleware tier comprising at least one transaction and database server, wherein said middleware tier includes hardware operatively coupled between said web server and said host processing system such that said middleware tier manages customer requests, interacts with said host processing system, and responds to said web server;

determining, at said middleware tier, that said host processing system is unavailable;

determining, at said middleware tier when said host processing system is unavailable, an available account number from an inventory of precreated accounts;

associating said personal information with said available account number to create an electronic record;

storing said electronic record in a temporary repository of the middleware tier to establish within said temporary repository an electronic account relating to said customer;

receiving database transaction instructions from said customer relating to said electronic account at the middleware tier, wherein one of the database transaction instructions includes funding said electronic account;

validating, verifying, and amending bank account information associated with said electronic account to conform with business rules using a rules engine on the middleware tier when the host processing system is unavailable;

utilizing said electronic account by executing said database transaction instructions at the middleware tier to perform a financial transaction;

creating a log of executed database transactions associated with said electronic account;

determining that said host processing system is available;

retrieving said electronic account from said temporary repository; and copying said electronic account and said log of executed database transactions to said host processing system.

* * * * *